United States Patent
Menon et al.

(10) Patent No.: US 12,506,791 B2
(45) Date of Patent: Dec. 23, 2025

(54) FOUNDATION MODEL DRIVEN APPLICATION THAT GENERATES REMEDIATION ACTIONS FOR CLOUD RESOURCE MISCONFIGURATIONS

(71) Applicant: Palo Alto Networks, Inc., Santa Clara, CA (US)

(72) Inventors: Vivek Hari Menon, Kochi (IN); Pranav Rai, Bengaluru (IN); Ankit Agarwal, Bangalore (IN); Akshay Raghunandan, Bengaluru (IN)

(73) Assignee: Palo Alto Networks, Inc., Santa Clara, CA (US)

( * ) Notice: Subject to any disclaimer, the term of this patent is extended or adjusted under 35 U.S.C. 154(b) by 2 days.

(21) Appl. No.: 18/621,585

(22) Filed: Mar. 29, 2024

(65) Prior Publication Data

US 2025/0310383 A1    Oct. 2, 2025

(51) Int. Cl.
*H04L 9/40* (2022.01)

(52) U.S. Cl.
CPC ........ *H04L 63/205* (2013.01); *H04L 63/1433* (2013.01)

(58) Field of Classification Search
CPC .................. H04L 63/205; H04L 63/1433
See application file for complete search history.

(56) References Cited

U.S. PATENT DOCUMENTS

| | | | |
|---|---|---|---|
| 11,165,800 B2 * | 11/2021 | Thampy | H04L 63/20 |
| 12,309,180 B1 * | 5/2025 | Shevrin | H04L 63/1433 |
| 2023/0376401 A1 * | 11/2023 | Wang | G06F 8/65 |
| 2024/0414211 A1 * | 12/2024 | Boyer | G06F 40/58 |
| 2025/0005051 A1 * | 1/2025 | Khosla | G06F 9/547 |

OTHER PUBLICATIONS

Karpukhin, et al., "Dense Passage Retrieval for Open-Domain Question Answering", arXiv:2004.04906v3, Sep. 30, 2020, 13 pages.
Lewis, et al., "Retrieval-Augmented Generation for Knowledge-Intensive NLP Tasks", arXiv:2005.11401v4, Apr. 12, 2021, 19 pages.

* cited by examiner

*Primary Examiner* — Darren B Schwartz
(74) *Attorney, Agent, or Firm* — Gilliam IP PLLC (57) ABSTRACT

A cloud misconfiguration remediation application ("remediation application") has been created that generates a remediation action for a resource misconfiguration detected with a CSPM policy. The remediation application includes a conversation agent that interacts with the foundation model according to a chain of prompts/input sequences. The conversation agent constructs the chain of prompts based on a template, the CSPM policy, metadata about the CSPM policy and the misconfigured cloud resource, and responses from the foundation model. The foundation model is implemented with retrieval augmented generation (RAG) that uses an embedding database built with remediation documentation of the CSP. Prompts from the conversation agent are augmented based on the implemented RAG. The remediation application aggregates the responses into a remediation action that can either be automatically performed or presented for consideration by a user.

20 Claims, 4 Drawing Sheets

FOUNDATION MODEL DRIVEN APPLICATION THAT GENERATES REMEDIATION ACTIONS FOR CLOUD RESOURCE MISCONFIGURATIONS

BACKGROUND

The disclosure generally relates to cloud security (e.g., CPC subclass G06F 21/00) and generative artificial intelligence (e.g., CPC class G06N).

Cloud service providers/platforms (CSPs) provide cloud computing technology that deliver computing resources in the cloud. With cloud computing, applications and other computing resources traditionally hosted on-premises are delivered by a CSP over the Internet. CSPs offer Anything-as-a-Service (XaaS) solutions, such as Infrastructure-as-a-Service (IaaS), Platform-as-a-Service (PaaS), and Software-as-a-Service (SaaS), which provide cloud-based infrastructure, cloud-based platforms, and cloud-based applications, respectively. A variety of vendors of hardware technology and software technology employ the services of CSPs for hosting technology in the cloud instead of or in addition to on-premises as hardware and software have traditionally been delivered. End users of a CSP, including such vendors of cloud-delivered technology, can interact with the CSP via application programming interfaces (APIs) of the CSP. Cloud APIs provide an interface for managing computing resources or utilizing the services of a CSP. To inform end users of the available functionality of the CSP that can be invoked via the cloud API exposed by the CSP, the CSP provides documentation for the cloud API that indicates functions of the cloud API, the associated request and response parameters, and any corresponding descriptions.

Cloud security posture management (CSPM) refers to management of security risks of cloud infrastructure, cloud infrastructure encompassing the software and hardware resources of a CSP. For a customer of a CSP, CSPM refers to management of the security risks to customer cloud assets (i.e., application(s), workload, and/or data). While the CSP is responsible for CSPM of the infrastructure provided by the CSP, the CSPM of customer assets involves monitoring assets for risks and compliance auditing based on policy definitions, scanning to ensure policy compliance, and remediation of detected risks. Scanning or searching for risks, such as misconfigurations, can be across cloud environments/infrastructure of different delivery models including Infrastructure as a Service (IaaS), Platform as a Service (PaaS), and Software as a Service (SaaS).

The Stanford Institute for Human-Centered Artificial Intelligence created an interdisciplinary initiative named the Center for Research on Foundation Models. They coined the term "foundation models" to refer to machine learning models "trained on broad data at scale such that they can be adapted to a wide range of downstream tasks." Some models considered foundation models include BERT, GPT-4, Codex, and LLAMA. Foundation models are based on artificial neural networks including generative adversarial networks (GANs), transformers, and variational encoders.

Applications that use foundation models have combined the use of a foundation model with retrieval augmented generation (RAG). RAG augments a query/prompt with context, in the form of embeddings, from an authoritative data source external to the foundation model. This separation allows for the authoritative data source to be more efficiently updated that updating knowledge of the foundation model and facilitates dynamic augmentation of a prompt with current context for a domain(s) represented by the authoritative data source. The RAG technique generates an embedding(s) from the prompt and retrieves similar embeddings from the authoritative data source. With the prompt and similar embeddings, the foundation model generates a retrieval augmented output that has been shown to be more accurate and context-relevant than without RAG. The paper that introduced the RAG framework is "Retrieval-Augmented Generation for Knowledge-Intensive NLP Tasks" published in NIPS'20: Proceedings of the 34th International Conference on Neural Information Processing Systems, December 2020.

BRIEF DESCRIPTION OF THE DRAWINGS

Embodiments of the disclosure may be better understood by referencing the accompanying drawings.

DESCRIPTION

The description that follows includes example systems, methods, techniques, and program flows to aid in understanding the disclosure and not to limit claim scope. Well-known instruction instances, protocols, structures, and techniques have not been shown in detail for conciseness.

Terminology

This description uses shorthand terms related to cloud technology for efficiency and ease of explanation. The term "cloud source" refers to an entity that has a network address that can be used as an endpoint for a network connection. The entity may be a physical device (e.g., a server), a service (e.g., Software-as-a-Service), or may be a virtual entity (e.g., virtual server or virtual storage device). In more general terms, a cloud resource accessible to customers is a resource owned/managed by the CSP that is accessible via network connections. Often, the access is in accordance with an API or software development kit provided by the CSP.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Overview

End users of a CSP can employ a security provider to monitor the assets or resources provisioned from the CSP. The security provider can monitor the resources to check for compliance with CSPM policies (or security policies). A dearth in people with expert knowledge for authoring CSPM policies has led to automatic generation of CSPM policies based on manually authored CSPM policies. When a misconfiguration is detected with a CSPM policy, a remediation action in accordance with the remediation commands provided by a cloud service provider/platform is performed to remediate the detected misconfiguration. However, the autogenerated CSPM policies often do not specify remediation actions. Indeed, few of the manually authored CSPM policies specify remediation actions. Some estimates are that approximately 10-15% of CSPM policies include remediation actions.

A cloud misconfiguration remediation application ("remediation application") has been created that generates a remediation action for a resource misconfiguration detected with a CSPM policy. The remediation application includes a conversation agent that interacts with the foundation model according to a chain of prompts/input sequences. The conversation agent constructs the chain of prompts based on a template, the CSPM policy, metadata about the CSPM policy and the misconfigured cloud resource, and responses from the foundation model. The foundation model is implemented with retrieval augmented generation (RAG) that uses an embedding database built with remediation documentation of the CSP. Prompts from the conversation agent are augmented based on the implemented RAG. The remediation application aggregates the responses into a remediation action that can either be automatically performed or presented for consideration by a user.

Example Illustrations

Figure 1:
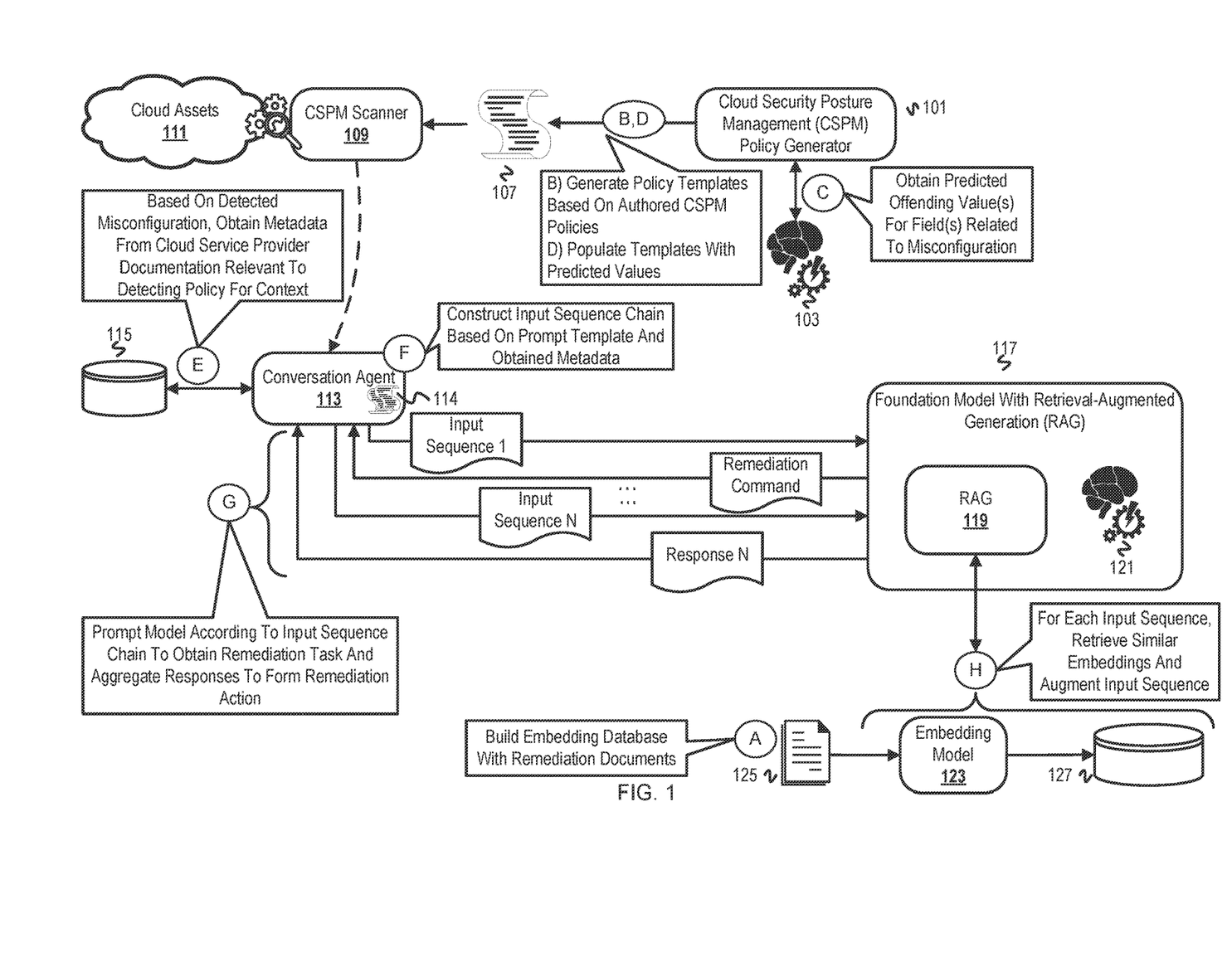
FIG. 1 is a diagram of a CSPM system that generates remediation actions for misconfigured cloud resources detected with CSPM policies.

FIG. 1 is a diagram of a CSPM system that generates remediation actions for misconfigured cloud resources detected with CSPM policies. The CSPM system includes a CSPM scanner 109, a CSPM policy generator 101, a conversation agent 113, and a hybrid model 117 that includes a retrieval augmented generation (RAG) component 119 and a foundation model 121. The CSPM policy generator 101 generates CSPM policies 107. The CSPM scanner 109 scans cloud assets/resources 111 of an organization with the CSPM policies 107 to detect misconfigurations. The system can be implemented with an architecture that generates events when a cloud resource misconfiguration is detected by the CSPM scanner 109. However the event is consumed, the event triggers the conversation agent 113 to interact with the hybrid model 117 to obtain a remediation action for the misconfiguration.

FIG. 1 is annotated with a series of letters A-H, each of which represents one or more operations. Although these stages are ordered for this example, the stages illustrate one example to aid in understanding this disclosure and should not be used to limit the claims. While order can vary, the stages represented by A-D will at least initially occur before the stages represented E-H. After the initial establishment of some of the repositories/databases and policies, these stages can be repeated for generation of additional policies and/or updating the databases. Subject matter falling within the scope of the claims can vary from what is illustrated.

At stage A, the CSPM system builds an embedding database 127 that will be used by the RAG component 119. An embedding model 123 (e.g., a word2vec model or large language model) generates embeddings or vectors with remediation documentation 125 to build an embeddings database 127. The remediation documentation 125 can be published manuals or command reference guides that include remediation commands and descriptions of the remediation commands. Embodiments can use a generalist embedding model or a domain specific embedding model. In the case of a domain specific embedding model, embodiments can create and maintain an embeddings database (also known as a vector index) for each CSP or service depending on organization of remediation commands and what CSPs are used by the organization with the cloud assets. The embeddings database 127 is used by the RAG component 119 (or can be considered part of the RAG component 119) to ground input sequences in the context of remediation documentation.

At stage B, the CSPM policy generator 101 generates templates of CSPM policies based on manually authored CSPM policies. The CSPM policy generator 101 parses the manually authored CSPM policies to determine fields by resource and emulates the structure of the authored policies with templates that indicate subject or target resources and one or more attributes/fields of the resources to detect misconfigurations.

At stage C, the CSPM policy generator 101 obtains predicted offending values for fields related to misconfigurations from a trained model 103. The trained model 103 can be the result of training an untrained model to obtain a classifier, for instance, or a pre-trained language model that was further trained or fine-tuned for predicting offending values of fields. An offending value of a resource field is a value set for a field that contributes or causes a security vulnerability due to the setting. Regardless of whether the value is valid or invalid based on documentation, the value is offending if it corresponds to a security vulnerability and is deemed a misconfiguration of the resource. The settings (i.e., values assigned to fields) indicated in a CSPM policy have been determined to be a misconfiguration based on expert cybersecurity knowledge. Thus, parsing the manually authored CSPM policies and training models based on the manually authored CSPM policies leverages the expert knowledge represented in the manually authored CSPM policies. To obtain the trained model 103, a model can be trained with a raw training dataset of authored CSPM policies with values masked and the offending values used as labels or targets. For a trained language model, the trained language model can be fine-tuned with prompts that indicate the CSPM policies and indication of the offending values of the fields.

At stage D, the CSPM policy generator 101 populates the templates with the predicted offending value(s) to instantiate or generate CSPM policies 107. For each policy template, the CSPM policy generator 101 can submit each field or all fields, depending upon the implementation of the model 103, for predicted offending values. Upon obtaining the offending values, the CSPM policy generator 101 can set the fields with the offending values. The generated CSMP policies 107 are communicated to a CSPM scanner 109. The CSPM scanner 109 scans cloud assets 111 based on the CSPM policies 107. If a misconfiguration is detected with a policy, then the CSPM scanner 109 will generate an event or notification that indicates the detected misconfiguration to the conversation agent 113. Although the CSPM scanner 109 detects a misconfiguration by evaluating or using the CSPM policies, this disclosure will sometimes refer to the CSPM policy as detecting the misconfiguration for brevity and sometimes refer to the CSPM policy as the "triggered policy" that indicates the misconfiguration.

At stage E, the conversation agent 113 obtains metadata from a database 115 relevant to the detected misconfiguration. The database 115 is a database of documentation for the CSP or at least a service corresponding to the cloud assets 111. The database 115 can be organized by resource and/or resource field. The conversation agent 113 queries the database 115 for metadata of the misconfigured cloud resource. The metadata returned can be a service name, resource type, resource identifier, resource description, and description for each field in the CSPM policy that detected the misconfiguration.

At stage F, the conversation agent 113 constructs an input sequence chain (or prompt chain) based on a prompt template and the obtained metadata. This disclosure will sometimes use input sequence instead of prompt to avoid a description that uses prompt as both a verb and a noun in close proximity to each other. One or more prompt templates 114 define multiple prompts that can be chained together for interacting with the foundation model to use at least part of a response as context for a subsequent prompt. The chain of prompts correspond to the task of obtaining a remediation action for the misconfiguration. The first prompt includes a subtask instruction to generate a remediation command. Subsequent subtask instructions can include requesting description of impact of running the returned remediation command, permissions or credentials necessary to run the remediation command, and a suggestion for a value to set for a remediation command. Each of the prompts can be defined with a syntax that allows for placeholders that can be filled/replaced with the metadata and/or parts of responses from the model 117.

At stage G, the conversation agent prompts the model 117 according to the input sequence chain. At stage H, the RAG component 119 retrieves similar embeddings from the embeddings database 127 for each input sequence and augments the input sequence. Stages G and H overlap because stage G encompasses multiple interactions and stage H occurs for each input sequence from the conversation agent. The conversation agent 113 prompts the model 117 with an input sequence 1. The RAG component 119 generates an embedding based on input sequence 1 with the embedding model 123 and searches for a set of one or more similar embeddings in the embedding database 127. Similarity threshold will depend upon implementation and the number of similar embeddings will depend upon configuration of the RAG component 119. The RAG component 119 then augments the input sequence 1 with the similar embeddings. The augmented input sequence 1 is used to prompt the foundation model 121. A response from the foundation model 121 includes a remediation command. Based on the remediation command, the conversation agent 113 constructs a next input sequence which is passed to the model 117 and augmented before the augmented input sequence is used to prompt the foundation model 121. Eventually, the conversation agent 113 constructs an input sequence N that is passed to the model 117 and augmented. The augmented sequence N is used to prompt the foundation model 121, which results in a response N being returned to the conversation agent 113. The conversation agent 113 aggregates the responses to form a remediation action. The formed remediation action, for example, can be the remediation command with fields set to remediate the detected misconfiguration, indication of a permission for running the command, and impact on the cloud resource from running the command.

While FIG. 1 presents a system that includes the policy generation and asset scanning, a remediation application that generates remediation actions for misconfigurations detected from the asset scanning would include the conversation agent 113 and at least the embeddings database 127. Various or all of the RAG component 119, embedding model 123, and the foundation model 121 could be on-premise/private or hosted externally with respect to the organization corresponding to the CSPM system.

Figure 2:
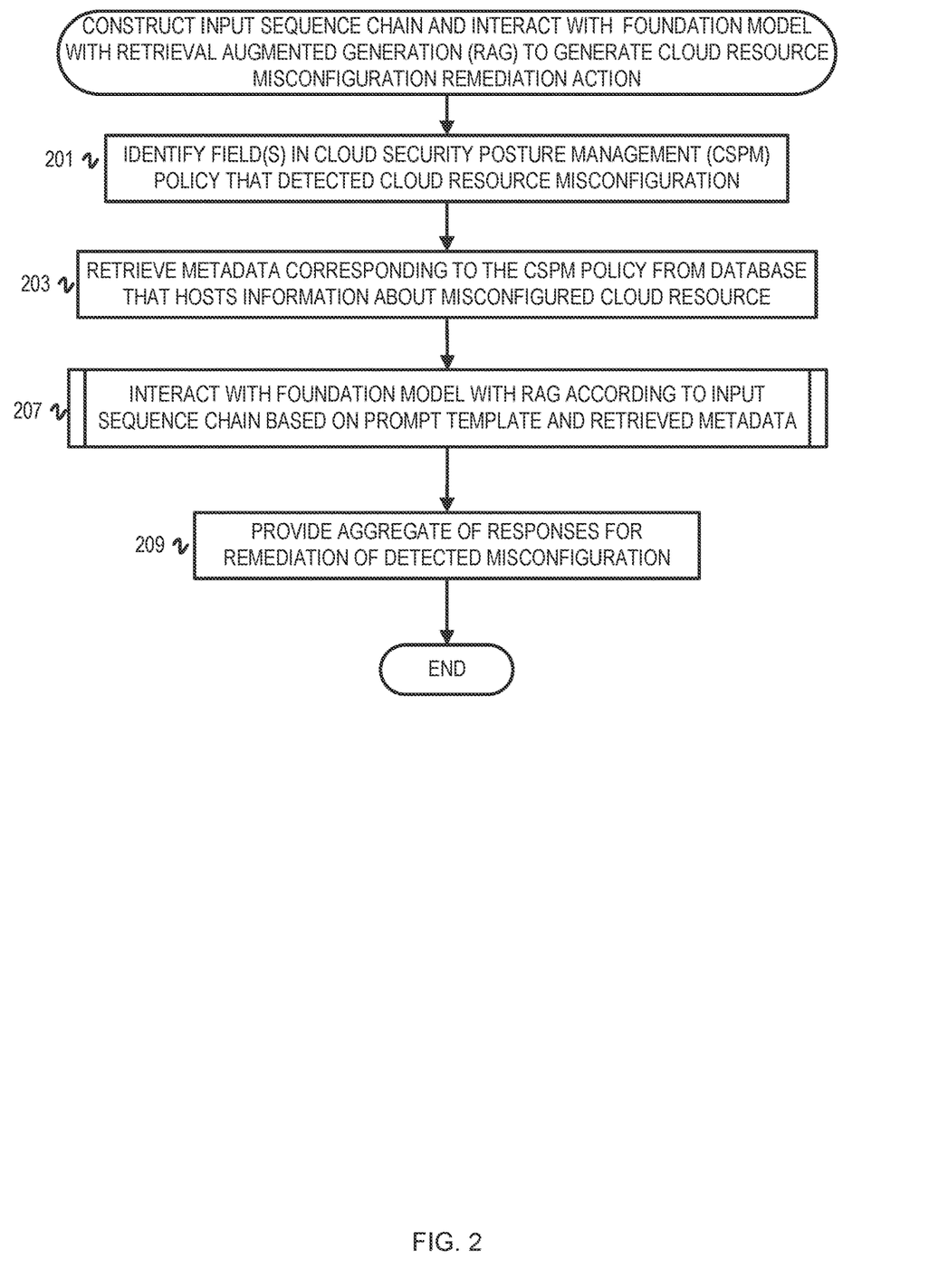
FIG. 2 is a flowchart of example operations for constructing an input sequence chain and interacting with a language model according to the input sequence chain to obtain a cloud resource misconfiguration remediation action.
Figure 3:
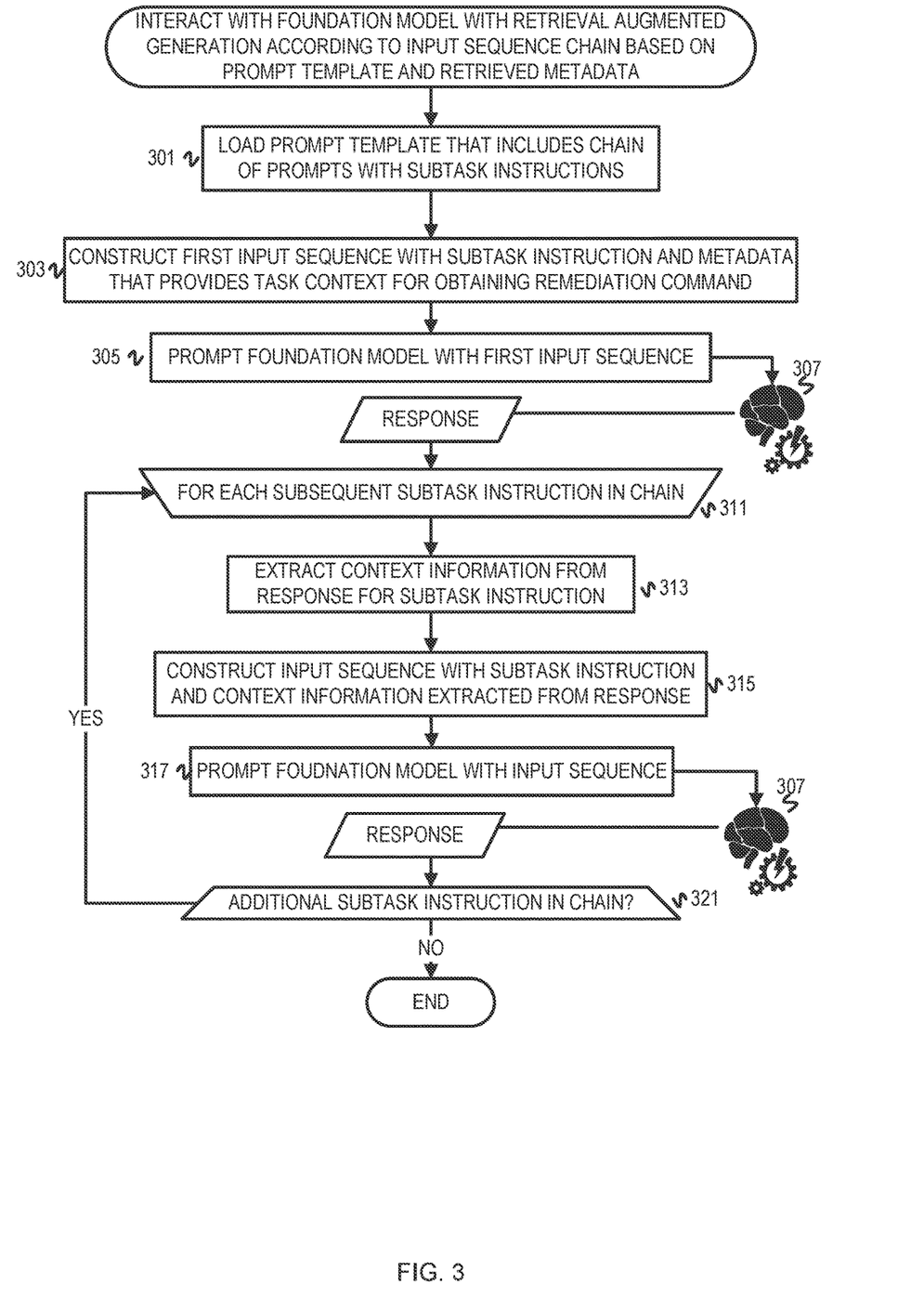
FIG. 3 is a flowchart of example operations for interacting with a foundation model with RAG according to the input sequence chain based on a prompt template and retrieved metadata.

FIGS. 2 and 3 are flowcharts of operations corresponding to the operations of the conversation agent in FIG. 1. The example operations are described with reference to the conversation agent for consistency with the FIG. 1 and/or ease of understanding. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary. For instance, some literature refers to a conversation agent but described their conversation agent with less capability than that described herein.

FIG. 2 is a flowchart of example operations for constructing an input sequence chain and interacting with a language model according to the input sequence chain to obtain a cloud resource misconfiguration remediation action. A system performs the example operations after detection and indication of a resource misconfiguration detected with a CSPM policy. A remediation action will at least indicate a remediation command that is supported by a CSP.

At block 201, a conversation agent identifies each field in a CSPM policy that indicates a cloud resource misconfiguration. The conversation agent parses the triggered CSPM policy to identify each field (i.e., determine the field identifiers or names). Below are examples of single field policies and a multi-field policy. The example single field policies are used to detect misconfiguration of a cluster for running a big data framework ("big data cluster"). The first example single field policy is used to identify unprotected big data clusters in a customer environment. A CSPM scanner will search for instances of big data clusters where the terminationProtected field is disabled, signifying that the instances are vulnerable to accidental termination. Utilizing this policy, a security vendor or customer ensures the security and stability of big data cluster instances, preventing unwarranted disruptions and potential data loss. A description of the field terminationProtected is that the field indicates whether the CSP will lock the cluster to prevent the big data cluster instances from being terminated by an API call or user intervention or in the event of a cluster error.

Single Field Policy Example 1 configfromcloud.resourcewherecloud.type='csp123'
 AND api.name=csp123-bigdata-describe-cluster and
 json.rule=terminationProtected is false The conversation agent identifies the field terminationProtected. The conversation agent then retrieves the description of the field, if not included within the policy metadata.

The second example single field policy is used to monitor cloud deployments of a MapReduce service, probing for any big data clusters that may be exposed to all users in a customer environment. Identifying such clusters helps uncover potential vulnerabilities that could jeopardize the security of a cloud environment.

Single Field Policy Example 2 configfromcloud.resourcewherecloud.type='csp123'
 AND api.name=csp123-bigdata-describe-cluster and
 json.rule=visibleToAllUsers is true The conversation agent identifies the field visibleToAllUsers. The conversation agent then retrieves the description of the field, if not included within the policy metadata. The field indicates whether a cluster is visible to identity management principals CSP account associated with the cluster. If visibleToAllUsers is set to true, principals in the CSP account can perform cluster actions on the cluster that their identity management policies allow If set to false, only the principal that created the cluster and the account root user can perform cluster actions regardless of identity management permissions policies attached to other principals.

The example multi-field policy is used to find pools of credentials that do not require symbols, uppercase letters, lowercase letters, or enforce case sensitivity in passwords.

Example Multi-Field Policy configfromcloud.resourcewherecloud.type='csp123'
    AND api.name=csp123-idp-user-pool and json.rule=RequireSymbols is false and RequireUppercase is false and RequireLowercase is false and RequireNumbers is false The conversation agent would extract the fields, RequireSymbols, RequireUppercase, RequireLowercase, and RequireNumbers. It would then retrieve, again if not indicated in the policy itself, the descriptions of the fields. A false setting for any one of the fields allows for a password without the corresponding constraint.

At block 203, the conversation agent retrieves metadata corresponding to the CSPM policy. With the identified fields of the CSPM policy, the conversation agent retrieves descriptions of the fields from a database that hosts information about cloud resources of the CSP. For instance, the conversation agent queries the database for descriptions of the identified fields. One of the identified fields of the CSPM policy will be for an identifier of the cloud resource that is misconfigured. The conversation agent query will also include the cloud resource identifier to obtain information about the cloud resource, such as cloud resource type and description of the cloud resource.

At block 207, the conversation agent interacts with a foundation model with RAG to generate a cloud resource misconfiguration remediation action. As mentioned earlier, the RAG component uses an authoritative data source built with remediation documentation of a CSP. FIG. 3 elaborates on the interaction according to the input sequence chain.

FIG. 3 is a flowchart of example operations for interacting with a foundation model with RAG according to the input sequence chain based on a prompt template and retrieved metadata. The interaction presumes a prompt template with a chain of prompts with placeholders. The task to be fulfilled is generation of a remediation action for the cloud resource misconfiguration that has been detected. The prompt chain breaks the task into subtasks that begin with generation of a remediation command and followed by one or more subtasks that provide additional information for running the command and possibly additional information about running the command.

At block 301, the conversation agent loads a prompt template that includes a chain of prompts with subtask instructions. Each of the prompts includes placeholders to be updated with context specific information, such as cloud resource type. The subtask instructions of prompts after the first prompt include placeholders to provide context based on a response to a preceding prompt. The prompt template can be written according to a language or a syntax of an orchestration framework or platform available for creating software applications that use foundation models. Examples include the LangChain framework, the Flow.ai platform, and the PromptChainer platform. An example prompt template and chain construction code is provided below.

```
# Construct prompt chain
template = """You are a CSP123 remediation expert. When answering
remediation commands, you use ${variable_name} to do variable
interpolation.
    For example, if we need to indicate region for a command,
your response should include --region ${region}. Keep the
variable name same as the property name in the documentation.
    Do not give a boilerplate explanation. Only return the
remediation command. If an explanation is wanted, I will ask in
subsequent prompts.
    If you don't know the answer, respond "I don't know". I will
use the phrase to make decisions. Don't hallucinate and do not
manufacture an answer.
    Use the following pieces of context to answer the question at
the end.
    {{ context }}
    Question: {{ question }}
Helpful Answer:
"""
# Using template engine examplej to combine date from responses
and templates
QA_CHAIN_PROMPT = PromptTemplate.from_template(
    template,
    template_format="examplej",
)
# Sample question
question = "For the service identity management and access
analyzer give the remediation command with correct api name to
set the status as ARCHIVED for a given resource."
def multiple_length_function(_dict):
    # CSP123 service command ....
    sub_command = _dict["remediation_command"]["result"].split("
")[2]
    services = _dict["remediation_command"]["service_name"] #
passed as list
    action = "".join(word.capitalize( ) for word in
sub_command.split("-"))
    return ", ".join((f"{service}:{action}" for service in
services))
def get_full_chain( ):
    qa_chain = RetrievalQA.from_chain_type(llm,
retriever=vectordb.as_retriever( ),
        return_source_documents=True,
        chain_type_kw_args={"prompt": QA_CHAIN_PROMPT},)
    impact_chain = (
        {"query": lambda input:
input["remediation_command"]["result"]}
        | PromptTemplate.from_template(
            "Describe the impact of {query}. The impact
description must be short, less than 15 words."
        )
        | llm
    )
    description_chain = (
        {
            "query": lambda input:
input["remediation_command"]["result"],
            "possible_permissions":
RunnableCompute(multiple_length_function),
        }
        | PromptTemplate.from_template (
            """What is the permission required by the remediation
service of CSP123 to run the {query}. A few examples of possible
permissions include {possible_permissions}.
            Select the best one. If my recommended permissions
are not correct, select the best permission that is correct.
            Do not repeat or return the query in the response.
What will happen on the successful execution of the query ?"""
        )
        | llm
    )
    parallel_chain = RunnableParallel(
        impact_chain=impact_chain, rem_desc=description_chain
    )
```

-continued

```
full_chain = {"remediation_command": qa_chain} |
RunnablePassthrough.assign(
    review={"parallel_chain":parallel_chain}
)
return full_chain
```

At block 303, the conversation agent constructs a first input sequence with the subtask instruction of the first prompt in the prompt chain. The conversation agent updates the first subtask instruction with the triggering CSPM policy and the retrieved metadata. The retrieved metadata and the CSPM policy provide context for the subtask of generating a remediation command. An input sequence is not limited to the single subtask instruction and the retrieved metadata. For instance, the first input sequence can also include a suggestion or recommendation for the subtask, such as a recommendation that the remediation command invert a value of a Boolean field indicated in the triggering CSPM policy.

At block 305, the conversation agent prompts the foundation model with the first input sequence. For instance, an API call to the foundation model with RAG is made that references the first input sequence. FIG. 3 depicts the operational flow representing the prompting of a foundation model 307 and operational flow proceeding to block 311 after the model 307 generates a response.

At block 311, the conversation agent begins operations for each subsequent subtask instruction in the prompt chain. The prompt template can be arranged so that the conversation agent can construct input sequences as ordered in the prompt template. Implementations can vary the chain by cloud resource type. For instance, the prompt template may specify different sets of subtask instructions depending upon the misconfigured cloud resource. In that case, the conversation agent may select the subtask instructions to form a chain according to the cloud resource identifier indicated in the CSPM policy.

At block 313, the conversation agent extracts context information from the response received from the model 307. In the case of the response to the first input sequence, the extracted context information is the remediation command generated by the model 307.

At block 315, the conversation agent constructs an input sequence with the subtask instruction (i.e., the current subtask instruction) and the context information extracted from the response. For example, the current subtask instruction may be to request credentials and/or a role necessary to run the remediation command extracted from the response. Construction of an input sequence is not limited to context information from the immediately preceding response. For instance, a next input sequence can be constructed with a next subtask instruction that requests a description of the impact of running the remediation command with the role specified in a preceding response. Thus, the next input sequence has been constructed with context information extracted from the first and second responses of this example.

At block 317, the conversation agent prompts the foundation model with RAG with the constructed input sequence. As with the first input sequence, FIG. 3 depicts the operational flow representing the prompting of the foundation model 307 and operational flow proceeding to block 321 after the model 307 generates a response.

At block 321, the conversation agent determines whether there is an additional subtask instruction for constructing an input sequence. If so, operational flow proceeds to block 311. Otherwise, the operational flow for FIG. 3 ends.

Returning to FIG. 2, the conversation agent provides an aggregate of the responses for remediation of the detected cloud resource misconfiguration. The aggregate of responses from interacting with the foundation model with RAG can include the remediation command, parameters for running the command (e.g., service name, role, credentials), and a description of the impact of running the command. The aggregate of the responses is considered the remediation action since it includes the command and information to perform the remediation and/or about the remediation. The conversation agent can then update a user interface with the remediation action. Embodiments can also run a script that runs the command with the information for running the command from the aggregate of responses. The conversation agent can be implemented to update a repository hosting the CSPM policies to associate the triggered CSPM policy with the remediation action. The remediation action can be incorporated into the CSPM policy, for example after approval by a cybersecurity personnel. Below are example remediation actions from aggregating model responses corresponding to the previous example CSPM policies.

Remediation Action for Example Single Field Policy 1

```
{"impact": " Enables termination protection for the
cluster.",
"description": " The permission required by remediation
service to run the `csp123 big data cluster modify-cluster-
attributes --cluster-id ${cluster_id} --termination-
protected` command is 'mapreduce:ModifyClusterAttributes'.
On successful execution of the command, the termination
protection of the specified cluster will be modified.",
"templateType": "StaticTemplate", "cliScriptTemplate": "
csp123 big data modify-cluster-attributes --cluster-id
${cluster_id} --termination-protected"}
```

Remediation Action for Example Single Field Policy 2

```
{"impact": " Restricts big data cluster visibility to only
the cluster creator.",
"description": " The permission required by remediation
service to run the `csp123 big data modify-cluster-
attributes --cluster-id ${cluster_id} --not-visible-to-all-
users` command is 'mapreduce:ModifyClusterAttributes'.
On successful execution of the query, the visibility of the
cluster will be changed to private, meaning that only the
users who have been explicitly granted access to the
cluster will be able to see it.", "templateType":
"StaticTemplate", "cliScriptTemplate": " csp123 bigdata
modify-cluster-attributes --cluster-id ${cluster_id} --not-
visible-to-all-users"}
```

Remediation Action for Example Multi-Field Policy

```
{"impact": " Ensure proper password checks are in place for
identity provider user pool",
"description": " The permission required by remediation
service to run the `csp123 -idp update-user-pool --user-
pool-id ${user_pool_id} --policies
{"PasswordPolicy":{"RequireUppercase":true,"RequireLowercas
e":true,"RequireNumbers":true,"RequireSymbols":true}} `
command is ` idp:UpdateUserPool`.
On successful execution of the command, the password checks
would be enforced.", "templateType": "StaticTemplate",
"cliScriptTemplate": " csp123 idp update-user-pool --user-
pool-id ${user_pool_id} --policies
{"PasswordPolicy":{"RequireUppercase":true,"RequireLowercas
e":true,"RequireNumbers":true,"RequireSymbols":true}} "}
```

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the prompt template loaded at block 301 in FIG. 3 may be performed more proximate to detection of the misconfiguration, for instance after or concurrently with metadata retrieval. As another example, each response can be provided for display in a user interface instead of an aggregate of responses. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 4:
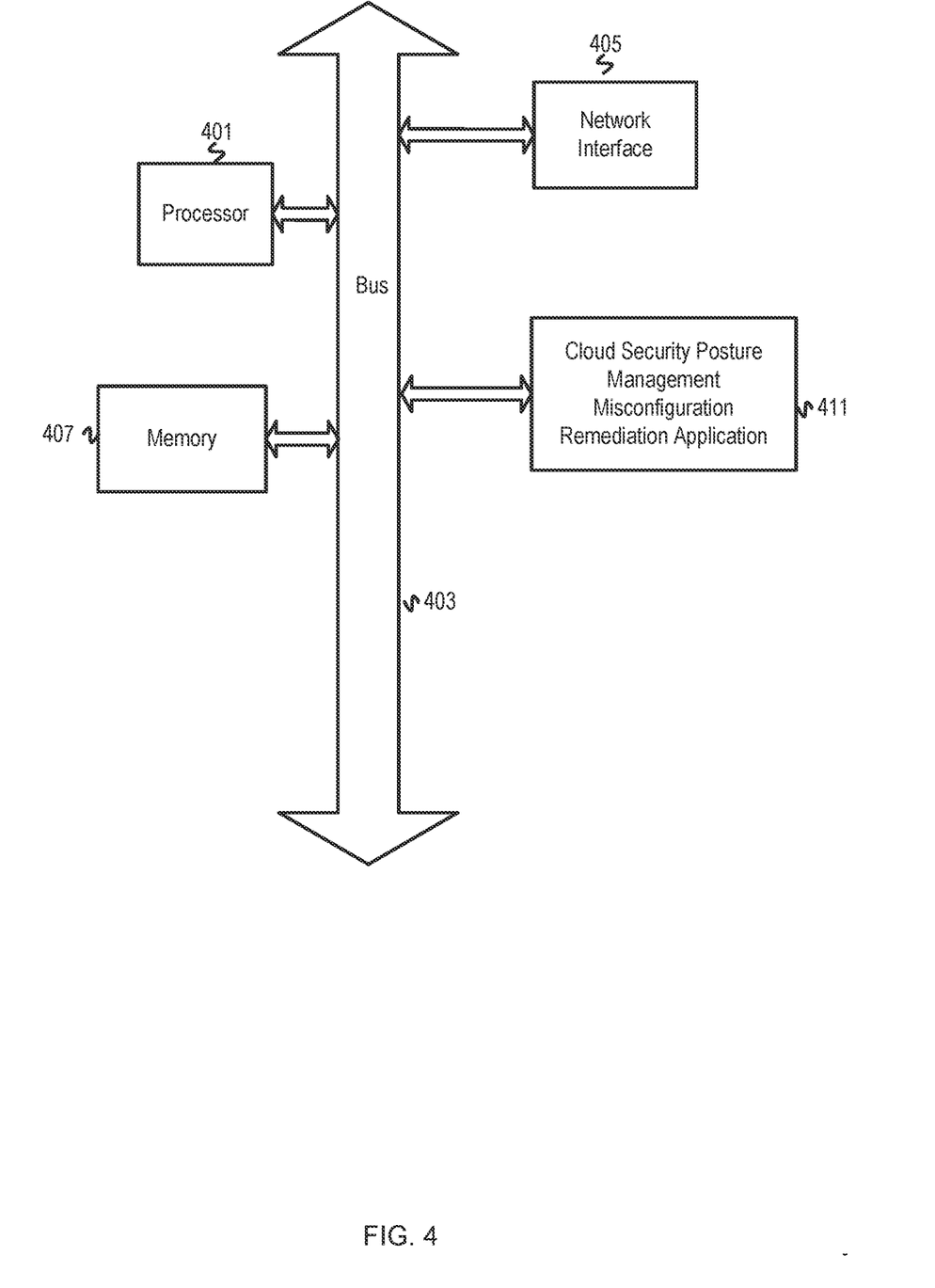
FIG. 4 depicts an example computer system with a CSPM misconfiguration remediation application.

FIG. 4 depicts an example computer system with a CSPM misconfiguration remediation application. The computer system includes a processor 401 (possibly including multiple processors, multiple cores, multiple nodes, and/or implementing multi-threading, etc.). The computer system includes memory 407. The memory 407 may be system memory or any one or more of the above already described possible realizations of machine-readable media. The computer system also includes a bus 403 and a network interface 405. The system also includes a CSPM misconfiguration remediation application 411. The CSPM misconfiguration remediation application 411 is driven by a foundation model with RAG. The CSPM misconfiguration remediation application 411 constructs a chain of input sequences to obtain a remediation action from the foundation model for a detected misconfiguration of a cloud resource. The CSPM misconfiguration remediation application 411 creates the input sequence chain from a prompt template, the CSPM policy indicating the misconfiguration, and metadata corresponding to the CSPM policy and the misconfigured resource. The foundation model with RAG generates responses that are grounded in remediation knowledge of a CSP that supports the cloud resource. The subtasks in the input sequence chain add information to the remediation command for running the remediation command and about running the remediation command. Any one of the previously described functionalities may be partially (or entirely) implemented in hardware and/or on the processor 401. For example, the functionality may be implemented with an application specific integrated circuit, in logic implemented in the processor 401, in a co-processor on a peripheral device or card, etc. Further, realizations may include fewer or additional components not illustrated in FIG. 4 (e.g., video cards, audio cards, additional network interfaces, peripheral devices, etc.). The processor 401 and the network interface 405 are coupled to the bus 403. Although illustrated as being coupled to the bus 403, the memory 407 may be coupled to the processor 401.

The invention claimed is:

1. A method comprising:
   interacting with a first language model to remediate a misconfiguration of a first cloud resource detected with a security policy, wherein interacting with the first language model comprises,
   retrieving metadata corresponding to each field of the security policy from a repository of information about cloud resources including the first cloud resource;
   constructing a first input sequence with the retrieved metadata, the security policy, and a first subtask instruction to remediate the misconfiguration;
   prompting the first language model with the first input sequence to obtain a remediation command, wherein the first language model includes retrieval augmented generation that uses an embeddings database built with remediation documentation of a cloud platform corresponding to the first cloud resource;

constructing a second input sequence with a second subtask instruction and indication of the remediation command;
prompting the first language model with the second input sequence to determine additional information for the remediation command; and
indicating a remediation task for the misconfiguration based on an aggregation of responses obtained from the prompting.

2. The method of claim 1 further comprising loading a prompt template that defines a chain that at least includes the first and second subtask instructions.

3. The method of claim 1, wherein the second subtask instruction requests at least one of a role, a permission, and a credential for the remediation command.

4. The method of claim 1, wherein the second subtask instruction requests explanation of impact of running the remediation command.

5. The method of claim 1 further comprising generating a plurality of security policy templates based on manually authored cloud security posture management security policies and, for each security policy template, predicting with a trained model an offending value for each field of the security policy template and generating a security policy with the security policy template and the predicted offending value for each field.

6. The method of claim 5 further comprising training a model to obtain the trained model, wherein training the model comprises training the model with fields and field descriptions extracted from specifications of a cloud service provider corresponding to the first cloud resource to learn offending values of the fields based on the manually authored cloud security posture management security policies.

7. The method of claim 1, wherein constructing the first input sequence is also with at least one of a description of the first cloud resource, a type of the first cloud resource, a service corresponding to the first cloud resource, and a description of the service corresponding to the first cloud resource.

8. The method of claim 1 further comprising crawling data of a cloud service provider corresponding to the first cloud resource to detect changes to remediation documentation and maintaining the embeddings database based, at least in part, on detected changes.

9. A non-transitory, machine-readable medium having program code stored thereon, the program code comprising instructions to:
identify each field of a cloud security policy corresponding to a detected misconfiguration of a first cloud resource;
retrieve metadata corresponding to each identified field from a repository of information about cloud resources including the first cloud resource;
construct a first prompt with a first subtask instruction to remediate the misconfiguration, the retrieved metadata, and the cloud security policy;
prompt a first language model with the first prompt to obtain a remediation command, wherein the first language model includes retrieval augmented generation that uses an embeddings database built with remediation documentation of a cloud platform corresponding to the first cloud resource;
construct a second prompt with a second subtask instruction and indication of the remediation command;
prompt the first language model with the second prompt to determine additional information for the remediation command; and
aggregate responses obtained from the first language model to indicate a remediation task for the misconfiguration.

10. The non-transitory, machine-readable medium of claim 9, wherein the program code further comprises instructions to load a prompt template that defines a chain that at least includes the first and second subtask instructions.

11. The non-transitory, machine-readable medium of claim 9, wherein the second subtask instruction requests at least one of a role, a permission, and a credential for the remediation command.

12. The non-transitory, machine-readable medium of claim 9, wherein the second subtask instruction requests explanation of impact of running the remediation command.

13. The non-transitory, machine-readable medium of claim 9, wherein the program code further comprises instructions to generate a plurality of security policy templates based on manually authored cloud security posture management security policies and, for each security policy template, predict with a trained model an offending value for each field of the security policy template and generate a security policy with the security policy template and the predicted offending value for each field.

14. The non-transitory, machine-readable medium of claim 13, wherein the program code further comprises instructions to train a model to obtain the trained model, wherein the instructions to train the model comprise instructions to train the model with fields and field descriptions extracted from specifications of a cloud service provider corresponding to the first cloud resource to learn offending values of the fields based on the manually authored cloud security posture management security policies.

15. The non-transitory, machine-readable medium of claim 9, wherein the instructions to construct the first prompt comprise the instructions to construct the first prompt also with at least one of a description of the first cloud resource, a type of the first cloud resource, a service corresponding to the first cloud resource, and a description of the service corresponding to the first cloud resource.

16. The non-transitory, machine-readable medium of claim 9, wherein the program code further comprises instructions to crawl data of a cloud service provider corresponding to the first cloud resource to detect changes to remediation documentation and instructions to maintain the embeddings database based, at least in part, on detected changes.

17. An apparatus comprising:
a processor; and
a non-transitory machine-readable medium having instructions stored thereon, the instructions executable by the processor to cause the apparatus to:
identify each field of a cloud security policy corresponding to a detected misconfiguration of a first cloud resource;
retrieve metadata corresponding to each identified field from a repository of information about cloud resources including the first cloud resource;
construct a first prompt with a first subtask instruction to remediate the misconfiguration, the retrieved metadata, and the cloud security policy;
prompt a first language model with the first prompt to obtain a remediation command, wherein the first language model includes retrieval augmented generation that uses an embeddings database built with remediation documentation of a cloud platform corresponding to the first cloud resource;

construct a set of one or more subsequent prompts with a set of one or more subsequent subtask instructions and indication contextual information from a response corresponding to a preceding prompt;

successively prompt the first language model with each of the set of one or more subsequent prompts to determine additional information for the remediation command; and aggregate the responses obtained from the first language model to indicate a remediation task for the misconfiguration.

18. The apparatus of claim 17, wherein the program code further comprises instructions to load a prompt template that defines a chain that includes the first subtask instruction and the set of subtask instructions.

19. The apparatus of claim 17, wherein the set of subsequent subtask instructions comprise at least one of a subtask instruction requesting at least one of a role, a permission, and a credential for the remediation command and a subtask instruction requesting explanation of impact of running the remediation command.

20. The apparatus of claim 17, wherein the non-transitory, machine-readable medium further has stored thereon instructions executable by the processor to cause the apparatus to generate a plurality of security policy templates based on manually authored cloud security posture management security policies and, for each security policy template, to predict with a trained model an offending value for each field of the security policy template and to generate a security policy with the security policy template and the predicted offending value for each field.

* * * * *